US009175439B2

(12) United States Patent
Tegman

(10) Patent No.: US 9,175,439 B2
(45) Date of Patent: Nov. 3, 2015

(54) METHOD FOR ARRANGING A CHEMICAL BARRIER IN A GASIFYING REACTOR FOR BLACK LIQUOR, A CHEMICAL GASIFYING REACTOR, A BARRIER LAYER OF A REACTOR AND A METHOD FOR MANUFACTURING A BUILDING BLOCK FOR SUCH A BARRIER LAYER

(75) Inventor: Ragnar Tegman, Luleå (SE)

(73) Assignee: CHEMREC AKTIEBOLAG, Stockholm (SE)

( * ) Notice: Subject to any disclaimer, the term of this patent is extended or adjusted under 35 U.S.C. 154(b) by 991 days.

(21) Appl. No.: 11/996,522

(22) PCT Filed: Sep. 6, 2006

(86) PCT No.: PCT/SE2006/050316
§ 371 (c)(1),
(2), (4) Date: Feb. 12, 2008

(87) PCT Pub. No.: WO2007/030078
PCT Pub. Date: Mar. 15, 2007

(65) Prior Publication Data
US 2008/0199374 A1   Aug. 21, 2008

(30) Foreign Application Priority Data

Sep. 7, 2005   (SE) ...................................... 0501977

(51) Int. Cl.
*B01D 3/02*   (2006.01)
*B01J 19/00*   (2006.01)
(Continued)

(52) U.S. Cl.
CPC ............ *D21C 11/122* (2013.01); *C04B 35/113* (2013.01); *C04B 35/44* (2013.01);
(Continued)

(58) Field of Classification Search
USPC ................................ 422/240–241; 427/376.2
See application file for complete search history.

(56) References Cited

U.S. PATENT DOCUMENTS 2,043,029 A * 6/1936 Blau et al. ..................... 501/127
5,807,798 A   9/1998 Bolt
(Continued)

FOREIGN PATENT DOCUMENTS

DE      102004007062 A1    8/2005
DE      10 2004 007 062 A1  9/2005
(Continued)

OTHER PUBLICATIONS

Japanese Office Action for corresponding JP application (dispatched Oct. 11, 2011).
(Continued)

*Primary Examiner* — Kaity Handal
(74) *Attorney, Agent, or Firm* — Jeffrey S. Melcher; Manelli Selter PLLC

(57) ABSTRACT

A chemical reactor and a method for arranging a ceramic barrier in a gasifying reactor, which reactor is arranged to convert high energy organic waste of black liquor type with a large amount of organic or inorganic alkali metal compounds, by high temperature oxidation with air or oxygen, whereby the organic waste is converted to a hot reducing gas containing a considerable amount of water vapour and the inorganic compounds form an alkali-containing salt melt at a temperature of 750-1150° C., and which reactor is arranged to comprise an outer shell (14) with associated inlet and outlet devices for reactants and products, the method comprising the arranging of a lining (16, 18) comprising one or more layers of ceramic barriers (16, 18) on the inside of the shell (14), the innermost ceramic barrier (16) of the reactor being composed of a lining material that primarily contains compounds of aluminium oxide ($Al_2O_3$), and at least one of alkali metal oxides ($Me2^{(I)}O$) and alkaline earth metal oxides ($Me^{(II)}O$), forming compounds of the type $Me2^{(I)}O \cdot Al2O3$ and $Me^{(II)}O \cdot Al_2O_3$.

30 Claims, 1 Drawing Sheet

(51) Int. Cl.
  *D21C 11/12* (2006.01)
  *C04B 35/113* (2006.01)
  *C04B 35/44* (2006.01)
  *C04B 35/443* (2006.01)
  *C04B 35/657* (2006.01)
  *C04B 35/66* (2006.01)
  *C10J 3/74* (2006.01)
  *F27D 1/00* (2006.01)

(52) U.S. Cl.
  CPC ............ *C04B 35/443* (2013.01); *C04B 35/657* (2013.01); *C04B 35/66* (2013.01); *C10J 3/74* (2013.01); *F27D 1/0006* (2013.01); *C04B 2235/3201* (2013.01); *C04B 2235/3206* (2013.01); *C04B 2235/3208* (2013.01); *C04B 2235/3218* (2013.01); *C04B 2235/3222* (2013.01); *C04B 2235/3241* (2013.01); *C04B 2235/77* (2013.01); *C04B 2235/80* (2013.01); *C04B 2235/9669* (2013.01); *C10J 2200/09* (2013.01)

(56) References Cited

U.S. PATENT DOCUMENTS

2005/0255986 A1* 11/2005 Kaneshige et al. ........... 501/120
2008/0254967 A1* 10/2008 Buchberger et al. .......... 501/120
2009/0295045 A1* 12/2009 Akash et al. ................. 264/640

FOREIGN PATENT DOCUMENTS

| DE | 102004007062 | 9/2005 |
| JP | 2001153321 A | 6/2001 |
| JP | 2001348278 A | 12/2001 |
| WO | 9429517 A1 | 12/1994 |
| WO | 0060162 A1 | 10/2000 |
| WO | 01/37984 A1 | 5/2001 |
| WO | 0137984 | 5/2001 |
| WO | 0137984 A1 | 5/2001 |
| WO | 2004051167 A1 | 6/2004 |

OTHER PUBLICATIONS

International Search Report, Feb. 19, 2007.
Supplementary European Search Report (completed Feb. 28, 2012) for corresponding EP application.
Communication mailed Mar. 7, 2013 in corresponding EP application No. 06 784 229.4-1361.
Examination Report issued in Canadian Patent Application No. 2,621,188 on Oct. 28, 2013.
American Journal of Science, 254, 3 (1956), p. 129-195 (Article: The System Na2O-Al2O3-SiO2).
Examination Report issued in Canadian Patent Application No. 2,621,188 on Jul. 3, 2014, pp. 1-2.

* cited by examiner

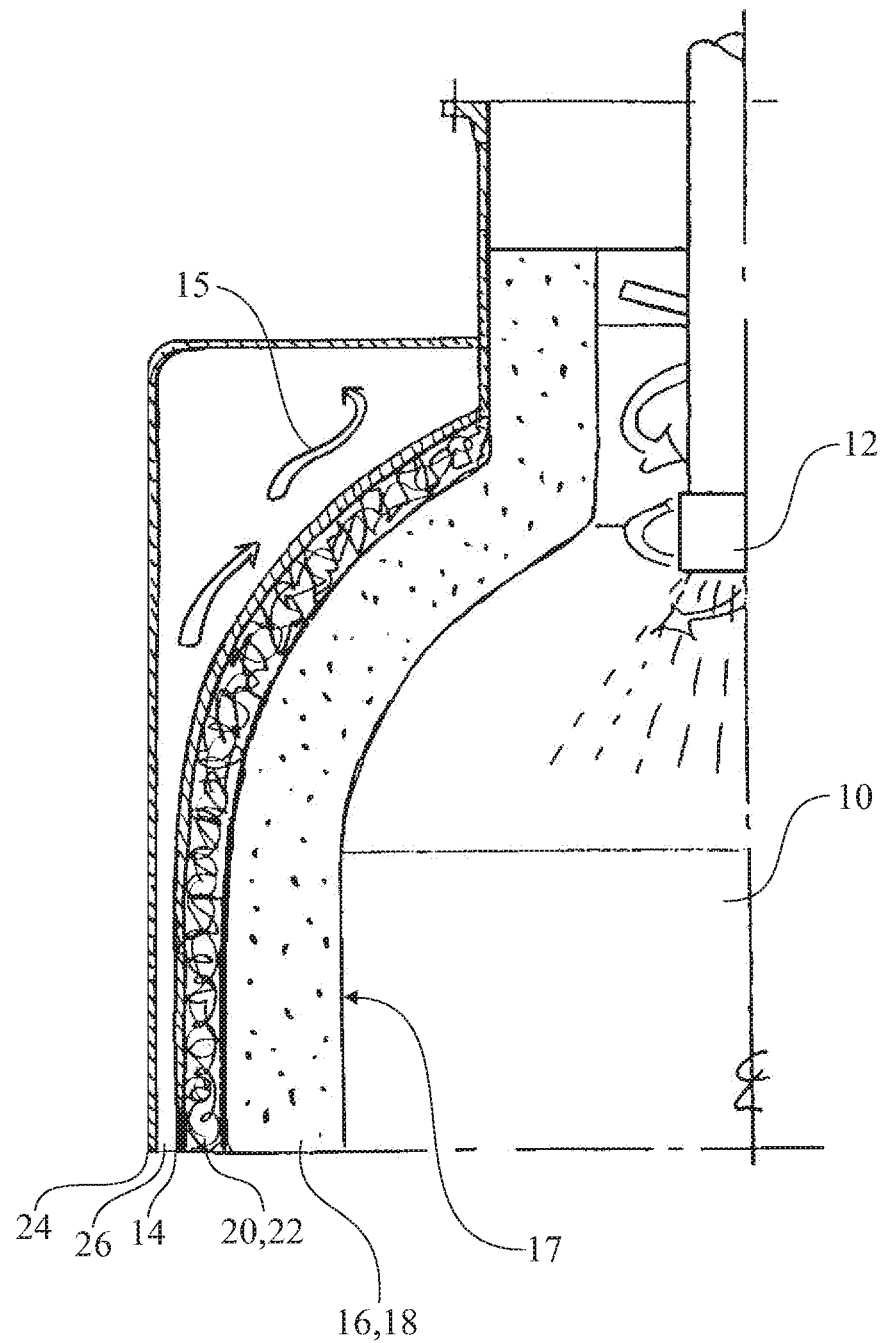

METHOD FOR ARRANGING A CHEMICAL BARRIER IN A GASIFYING REACTOR FOR BLACK LIQUOR, A CHEMICAL GASIFYING REACTOR, A BARRIER LAYER OF A REACTOR AND A METHOD FOR MANUFACTURING A BUILDING BLOCK FOR SUCH A BARRIER LAYER

CROSS REFERENCE TO RELATED APPLICATIONS

This application is a national stage entry under 35 U.S.C. 371 of International Application No. PCT/SE2006/050316, filed 6 Sep. 2006, designating the United States. This application claims foreign priority under 35 U.S.C. 119 and 365 Swedish Patent Application No. 0501977-3, filed 7 Sep. 2005.

TECHNICAL FIELD

The present invention relates to a method for the conversion, in a chemical reactor, of high energy organic waste of black liquor type with a large amount of organic and inorganic alkali metal compounds, by partial high temperature oxidation with air or oxygen, whereby the organic waste is converted to a hot reducing gas containing a considerable amount of water vapour, hydrogen gas and carbon monoxide and the inorganic compounds form an alkali-containing salt melt at a temperature of about 750-1200° C., preferably 950-1150° C., which reactor comprises an outer shell with associated inlet and outlet devices for reactants and products as well as a lining arranged on the inner side of the shell and comprising one or more ceramic barrier layers, the total thickness and the thermal conductivity of the lining being chosen such that an inner surface of the lining facing the reaction chamber gets a high enough temperature for the formed salt melt in contact with this surface to have a high enough volume part of melt in order to flow freely on this surface, and that the temperature in the rest of the lining, which is positioned closer to the outer shell, is low enough for the formed salt melt, that by capillary forces or hydrostatic forces strives to penetrate cavities in the form of joints, cracks or porosities in said one or more ceramic barrier layers, solidifies to form solid salts at a location within said one or more ceramic barrier layers, and that the temperature of the reactor shell is controlled in order to prevent detrimental over-temperatures on the reactor shell.

The invention also relates to a chemical reactor for practising the method, a reactor lining intended for said reactor and a method for manufacturing a building block for such a reactor lining.

PRIOR ART

When gasifying black liquor with air or oxygen at a temperature of about 750-1150° C. in a reactor of for example the type disclosed in WO 2004/051167 A1 (Chemrec Aktiebolag), there will be generated a corrosive and highly reducing gas phase as well as a corrosive salt melt. The gas phase contains primarily $H_2O$, $H_2$, $CO_2$, CO, $H_2S$, $N_2$ and $CH_4$ and small amounts of NaOH(g), Na(g) och KCl(g). Formally, the salt melt consists of a homogeneous mixture of positively and negatively charged ions, primarily $Na^+$, $CO_3^{2-}$, $S^{2-}$ and $OH^-$, and can be described essentially as a molten mixture of the compounds $Na_2CO_3$, $Na_2S$, NaOH but also comprising small amounts of other ions from $Na_2SO_4$, NaCl, $K_2CO_3$ and KCl in the melt. The salt melt flows freely down to a temperature of about 750° C. at which it solidifies to form a solid salt mixture that essentially consists of $Na_2CO_3$(ss) and $Na_2S$(s). The salt melt is very corrosive to metals and as well as to ceramics. In order for the outer steel shell of the reactor not to be exposed to too high a temperature or to be harmed by corrosive gas phase compounds or by the salt melt, there is required an efficient chemical barrier as well as a good thermal insulation of the reactor shell. As a barrier material in the reactor there can be used either a relatively thick ceramic lining or a ceramic coated and well cooled metal screen, see for example WO 01/37984 A1 (Kvaemer Chemrec AB). The outer shell steel of the reactor must of course not be exposed to any inadmissibly high mechanical stresses of either local or general nature or to any inadmissibly high temperatures, and must moreover not come in contact with compounds that are corrosive to the steel.

The reactor is used for recovery of energy and chemicals in a pulp mill and must be able to be operated continuously. Unscheduled shutdowns of the reactor plant will quickly result in costly disturbances in the mill's chemical recovery and in case of longer shutdowns it will lead to costly production losses for the pulp mill. Hence, there are very high demands on reliability in operation as well as on operational availability for such a plant. Since the plant produces large amounts of salt melt and large amounts of a high energy combustible gas that contains toxic and evil-smelling compounds, high demands are put on system safety as well as on the reactor vessel and all its connections and wall entrances always being gastight. In order to maintain high system safety and to avoid disturbances in the chemical recovery or damages to the ceramic lining or the reactor shell, it is important that the reactor temperature can be reliably measured and controlled. Too high a reactor temperature will render the salt melt very corrosive; while too low a reactor temperature will result in cease of the gasifying reaction whereby the salt melt gets contaminated by poorly combusted black liquor or solidifies to form a solid mass on the reactor walls.

When the inner ceramic barrier of a reactor is heated from room temperature to a temperature corresponding to the melting point of the salt melt, about 750° C., a considerable thermal expansion takes place in the ceramics, as is described in WO 2004/051167 A1 and WO 01/37984, while the outer reactor steel shell on the outside thereof expands less due to the fact that it must be maintained at a relatively low temperature primarily for corrosion and strength reasons. Hence an adequate thermal expansion room must always exist between the inner side of the steel wall and the outer side of the ceramic barrier in order to avoid the appearance of dangerously high compressive loads between the steel shell and the ceramics when the reactor is heated and operated. A cylindrical reactor requires a radial expansion room of about 1% of the cylinder's radius and an axial expansion room of about 1% of the cylinder's axial length.

It is therefore suggested in WO 2004/051167 A1 and WO 01/37984 that one or more mechanically flexible layers are positioned between the reactor shell and the closest ceramic barrier. Such layers can consist of open gaps, temporary combustible inserts, soft ceramic fibre mats, porous metallic structures or other flexible structures that are easy to deform adequately at a low level of mechanical load that can be considered to be allowed in regard of the strength of the reactor vessel. It is also an advantage for the physical stability of the ceramic barrier in connection with repeated thermal cycling that the ceramic blocks continuously get a small outer support from the reactor shell, via a suitable flexible and resilient layer. A resilient support layer that can at least resume a play formed between the ceramic barrier and the reactor shell when the reactor cools off also fulfils two other important functions, one being that it prevents the required expansion room, primarily in the lower parts of the reactor, from being filled up by debris consisting of small and hard fragments of the ceramic barrier and the other being that it prevents gas convection and thereby undesired heat transport between the hot ceramic barrier and the relatively cool reactor shell.

A method for the manufacturing of a refractory material that can be used as a barrier material in chemical reactors, i.e. as a lining, is known from U.S. Pat. Nos. 5,106,797, 5,149, 412 and EP 690139. These known materials are however primarily intended to be used in the manufacturing of aluminium. The refractory material is usually manufactured from a by-product from the manufacturing of $Al_2O_3$ by the Bayer process and its main component is $Fe_2O_3$ but it also contains $Al_2O_3$ and small amounts of $Na_2O$ and $CaO$ as well as other constituents. The calcined product is grinded, mixed with a binder (e.g. colloidal silicon dioxide, colloidal aluminium oxide, sodium silicate or sodium aluminate) and water and is then shaped into formed bodies that are baked. It is in common for all these barrier materials that they are developed with the purpose of having good barrier properties against molten aluminium, which means requirements that differ completely from those for a chemical reactor for a salt melt.

Many technical oxide based ceramics contain other substances that can amount to 5-20 percentage units and that are related to impurities in the raw material for the ceramics or are related to deliberate additives of cheap but impure raw materials. In addition, certain other technical additives can be used such as $CaO.Al_2O_3$, which act as binders in the cold forming of refractory cement bricks, fluxing agent additives in order to promote fast densification in connection with sintering, additives to suppress undesired crystal growth in connection with sintering or melt casting or additives to improve fracture toughness or thermal chock resistance of the ceramic materials. Most additives that can give rise to low-melting phases in reactions between the salt melt and all other compounds included in the ceramic barrier will, as can be expected, impair long term durability of the barrier materials in connection with normal operation of the reactor.

One problem with these oxide based ceramics is however that they will react in different ways with the hot alkaline salt melt that all the time flows over the ceramic lining and that also, due to capillary forces, penetrates deep into joints, cracks and open pores in the lining. At high temperatures, the ceramic lining can also react directly with alkaline compounds in the gas phase that of course easily penetrates deep into the lining. Such undesired chemical reactions can result in impaired properties of the ceramics, in various ways, or that the materials physically decompose due to large mechanical stresses built up in the materials in connection with such reactions.

One problem that is very marked and serious and that arises in connection with these reactions between the ceramic lining, the salt melt and the gas phase, is that many of these reactions result in a considerable increase in the amount of solid phases in the lining, which in turn makes the ceramics grow slowly whereby the thermal expansion room required between the inner side of the reactor vessel and the outer side of the ceramic lining is consumed, where after the reactor vessel may be exposed to a dangerously high mechanical load from the expanding lining.

It may seem easy to increase the expansion room between the expanding ceramic lining and the inner side of the reactor vessel by using a wide gap or a thick and compliant ceramic fibre mat, such that the ceramic lining could be allowed to expand considerably without dangerously getting in contact with the reactor vessel. Unfortunately, a wide gas gap or a thick and porous fibre mat has very poor thermal conductivity as compared to a corrosion resistant ceramic lining. Typically, a ceramic fibre mat has a thermal conductivity that is 50-100 times lower than that of a dense sintered oxide ceramic of the same thickness. Also a relatively thin fibre mat, that allows for a small expansion room, will all the same result in a very flattened temperature profile in the ceramic lining and a very steeply dropping temperature profile in the fibre mat. Such an unfavourable temperature distribution will result in a mean temperature that is far too high in the ceramic lining as well as in a high lowest temperature on the outside of the ceramic lining, which in turn will lead to faster chemical reactions between the salt melt and a hot lining. In worst case the salt melt may penetrate through the entire ceramic lining and reach parts of the compliant fibre mat in order to solidify there, thereby quickly consuming the expansion room required for the lining.

The only way of preventing the salt melt from penetrating through the ceramic lining, maybe reaching the expansion room and damaging the reactor wall, is to maintain the temperature of the salt melt low enough for the salt melt to solidify to form an essentially solid salt inside the colder parts of the ceramic lining. Hence, it is important that the thickness and thermal conductivity of the different ceramic linings are chosen such that the inner side of the barrier is so hot that the salt melt always will flow freely and easily will flow out from the reactor during normal operation, while the colder outer part of the ceramic lining will make the salt melt solidify completely, which does not take place until a temperature of 750° C. Thereby, the melt is prevented from penetrating cracks and pores deeply into the outer part of the lining. Therefore, WO 2004/051167 A1 suggests that the temperature profile should be controlled such that it is made sure that condensation or transition into the solid phase of alkaline compounds that penetrate into the ceramic lining always takes place inside the lining, preferably inside an outer layer, the base layer, of the lining, irrespective of the condition of the inner layer, the wear layer, that delimits the reaction chamber.

BRIEF ACCOUNT OF THE INVENTION

It is an object of the present invention to achieve a novel method of the type mentioned in the introduction, in connection with which at least some of the problems mentioned above are solved. This is achieved in the method according to the invention by the innermost ceramic barrier of the reactor being composed primarily of compounds of aluminium oxide ($Al_2O_3$) and at least one of alkali metal oxides ($Me_2^{(I)}O$) and alkaline earth metal oxides ($Me^{(II)}O$), forming compounds of the type $Me_2^{(I)}O.Al_2O_3$ and $Me^{(II)}O.Al_2O_3$.

By choosing said lining material that is primarily composed of binary and ternary compounds of aluminium oxide ($Al_2O_3$), alkali metal oxides ($Me_2^{(I)}O$) and/or alkaline earth metal oxides ($Me^{(II)}O$), which material will not dangerously expand during long term contact with the salt melt thereby quickly consuming the expansion room required for the lining, the problem relating to penetration of the salt melt into the lining followed by an expanding and poorly functioning ceramic lining inside a reactor vessel is solved.

Suitably, the lining material is chosen such that the alkaline component and the aluminium oxide of the compound have a molar ratio of close to 1:1 in relation to each other.

It is suitable for the oxidation that the energy rich organic waste is combusted with air or oxygen-enriched air at an enhanced reactor pressure, preferably a pressure of 0.2-5 MPa.

It is advantageous that the energy rich organic waste consists essentially of thick waste liquor/black liquor from a pulp mill. Alternatively, it consists primarily of alkaline soap, primarily separated alkaline salts of fatty acids and resin acids from weak liquor and mixed black liquor from a pulp mill.

Another object of the present invention is to achieve a reactor of the type mentioned in the introduction, which reactor is suitable for the practising of the above described method and in which the salt melt is prevented from penetrating through the ceramic lining and reaching the expansion room harming the reactor wall. According to the invention this is achieved by the reactor of the type mentioned in the introduction being designed such that the innermost ceramic barrier of the reactor is essentially composed of compounds of aluminium oxide ($Al_2O_3$) and at least one of alkali metal oxides ($Me_2^{(I)}O$) and alkaline earth metal oxides ($Me^{(II)}O$), forming compounds of the type $Me_2^{(I)}O.Al_2O_3$ and $Me^{(II)}O.Al_2O_3$. Solid solution may however exist to a certain extent in mixtures of different phases of the type mentioned above.

By the innermost ceramic barrier of the reactor primarily being composed of binary and ternary compounds of aluminium oxide ($Al_2O_3$), alkali metal oxides ($Me_2^{(I)}O$) and/or alkaline earth metal oxides ($Me^{(II)}O$), which material will not dangerously expand during long term contact with the salt melt thereby quickly consuming the expansion room required for the lining, the problem relating to penetration of the salt melt into the lining followed by an expanding and poorly functioning ceramic lining inside a reactor vessel is solved. According to a preferred embodiment it is suitable for said compounds to cause a volume expansion of the lining of not more than 10%, preferably not more than 7% and even more preferred not more than 5% at reaction with the formed salt melt.

Preferably the ceramic barrier consists of a blend of 50-99 mol % $Na_2Al_2O_4$, preferably 55-90 mol % $Na_2Al_2O_4$, 5-35 mol % $MgAl_2O_4$ and 5-10 mol % $Na_2O.MgO.5Al_2O_3$. Note that the three different chemical ways of writing, such as $Na_2Al_2O_4$, $NaAlO_2$ and $Na_2O.Al_2O_3$, respectively, are completely equivalent designations for one and the same compound.

In an alternative embodiment, at least 60% of the ceramic barrier consists of $Me_2Al_2O_4$, in which Me represents a mixture of Na and K.

The composition of the lining material can for example be adapted to the composition of the salt melt produced in the reactor. It can for example be suitable to let a considerable amount, at least 50%, of the alkali metals in the lining be potassium oxide, $K_2O$, when the process of producing cellulose is potassium based.

According to an additional aspect of the invention it may even be possible that the chemical reactions between the salt melt and the lining material cause a volume reduction of the lining material, which can be an advantage.

If desired it is possible for preferably 5-20% of the $Al_2O_3$ component in the ceramic barrier to be replaced by the isostructurally similar component $Cr_2O_3$.

According to another alternative, the ceramic barrier is divided into two ceramic barriers consisting of one inner ceramic barrier that is intended to be in direct contact with the salt melt and consisting of compounds of aluminium oxide ($Al_2O_3$) and at least one of alkali metal oxides ($Me_2^{(I)}O$) and alkaline earth metal oxides ($Me^{(II)}O$), and one outer ceramic barrier that consists of a material having a lower thermal conductivity than the inner layer and being designed such that the melt is allowed to solidify within the outer barrier.

According to yet an alternative it is an advantage if there is a compliant barrier of ceramic and/or metallic materials between the outer ceramic barrier and the reactor shell, which compliant barrier can be compressed in respect of its thickness by at least 60% at a pressure of not more than 1 MPa and that has resilient properties of at least 10% when releasing the pressure to 0.05 MPa.

Suitably, the $Na_2Al_2O_4$ component of the ceramic barrier has been manufactured by allowing $Al(OH)_3$ or fine grain $\alpha$-$Al_2O_3$ to react with molten $Na_2CO_3$ in a sintering reaction at a temperature of 1200-1400° C., preferably about 1350° C., the reacted mixture after cooling off being dry crushed to form a free flowing fine grain powder together with other ceramic powder phases such as $MgAl_2O_4$, in a grinder having grinding bodies of $Al_2O_3$, and the powder mixture having a grain size distribution adapted for powder pressing there after being filled into a forming cavity and being pressed at a high pressure to form preformed bodies that are then being finally sintered in a closed kiln room at a high temperature for a certain time to give a density that will yield a desired residual porosity of 10-25% in the sintered ceramic body.

BRIEF DESCRIPTION OF THE ENCLOSED DRAWINGS

In the following, the invention will be described in greater detail with reference to the preferred embodiments and the enclosed drawing.

FIG. 1 is a view in cross-section showing a vertical cut through an upper portion of a chemical reactor according to a preferred embodiment of the invention.

DETAILED DESCRIPTION OF PREFERRED EMBODIMENTS

The chemical reactor shown in FIG. 1 is intended for gasification of black liquor with air or oxygen under the formation of a gas phase that is corrosive as well as strongly reducing and a corrosive salt melt, at a temperature of about 750-1200° C., preferably 950-1150° C., and it is intended to be used primarily for recovery of energy and chemicals from a pulp mill. The reactor comprises a reactor pressure vessel 14 with a ceramic refractory lining 16 and a burner 12 through which the energy rich organic waste, preferably thick waste liquor/black liquor from a pulp mill, is injected in order to, by partial oxidation with air or oxygen enriched air at a high temperature and preferably elevated pressure in the reactor, suitably a pressure of 0.2-5 MPa, be converted essentially in an extremely hot flame into a hot reducing gas containing a considerable amount of water vapour, hydrogen gas and carbon monoxide, while the inorganic compounds form an alkaline salt melt at a temperature of about 750-1150° C. In one embodiment of the invention the energy rich organic waste can also consist essentially of alkaline soap, primarily separated alkaline salts of fatty acids and resin acids from weak liquor and mixed black liquor from a pulp mill. Suitably, the energy rich organic waste is only partially oxidised to form a reducing gas and a salt melt, preferably such that the carbon activity in the gas phase that leaves the reactor is less than 1 but more than 0.01 as calculated at the temperature of the outlet gas. Naturally, the reactor pressure vessel 14 is provided with conventional inlet and outlet devices (not shown in detail) for all reactants and products, and if so needed with one or more oil burners for auxiliary heating of the reactor.

In a simple embodiment the reactor comprises a ceramic barrier formed of one layer. In a preferred embodiment the ceramic lining is however divided into two ceramic barriers, namely an inner wear layer 16 facing the reaction chamber 10 of the reactor and an outer base layer 18. The lining 16, 18 is provided with an inner surface 17 facing the reaction chamber. A gap is shown between the pressure vessel wall 14 and the ceramic lining 16, 18, which gap forms an expansion room 20 for the ceramic lining. This gap 20, or at least a vertical portion of it, typically has a width of about 20-60 mm, preferably 30-50 mm, and the width may increase in an upwards direction towards the reactor top. As is shown, the reactor pressure vessel is enclosed by a cooling hood 24 for cooling the pressure vessel wall 14 and by a not shown fan a flow of cooling air 15 can be led through a room 26 formed between the reactor pressure vessel 14 and the cooling hood 24. In one embodiment of the invention the temperature on the reactor shell 14 is controlled by an outer air flow having such an air velocity and temperature that the temperature on the inside of the shell 14 becomes higher than the dew point of the process gas at the prevailing water vapour pressure in the system but not to a temperature that is higher than that prescribed in the strength code for the reactor pressure vessel.

For a reactor in the form of a vertical cylinder having a diameter of about 3 m and a height of about 9 m and an operational temperature on the ceramic lining of about 1000° C., a radial expansion room is required at the taking into operation of the reactor of at least 15 mm between the inner side of the reactor shell 14 and the outer side of the ceramic barrier, as well as an axial expansion room of at least 90 mm, in order to avoid harmful close contact between the reactor shell 14 and the ceramic barrier 18 in connection with heating and operation.

Therefore, one or more mechanically compliant layers 22 are normally positioned between the reactor shell 14 and the ceramic barrier 16, 18. Such layers can consist of open gaps, temporary combustible inserts, soft ceramic fibre mats, porous metallic structures or other flexible structures that are easy to deform adequately at a low level of mechanical load that can be considered to be allowed in regard of the strength of the reactor vessel 14. It is also an advantage for the physical stability of the ceramic barrier 16, 18 in connection with repeated thermal cycling that the ceramic blocks continuously get a small outer support from the reactor shell 14, via a suitable compliant and resilient layer 22. A resilient support layer 22 that can at least resume a play formed between the ceramic barrier 16, 18 and the reactor shell 14 when the reactor cools off also fulfils two other important functions, one being that it prevents the required expansion room, primarily in the lower parts of the reactor, from being filled up by debris consisting of small and hard fragments of the ceramic barrier and the other being that it prevents gas convection and thereby undesired heat transport between the hot ceramic barrier and the relatively cool reactor shell. According to a preferred embodiment of the invention there is accordingly a compliant barrier 22 of ceramic and/or metallic materials between the outer ceramic barrier 18 and the reactor shell 14, which compliant barrier can be compressed in respect of its thickness by at least 60% at a pressure of not more than 1 MPa and that has resilient properties of at least 10% when releasing the pressure to 0.05 MPa. When the compliant barrier 22 between the reactor shell 14 and the outermost ceramic barrier 18 consists of a ceramic material it is suitable to use ceramic fibres having a content of $Al_2O_3$ of at least 63%.

As mentioned in the introduction, the present invention relates to a method for the conversion, in a chemical reactor, of high energy organic waste of black liquor type with a large amount of organic or inorganic alkali metal compounds, by high temperature oxidation with air or oxygen, whereby the organic waste is converted to a hot reducing gas containing a considerable amount of water vapour, hydrogen gas and carbon monoxide and the inorganic compounds form an alkali-containing salt melt at a temperature of 750-1200° C., usually 950-1150° C., Moreover, the invention also relates to a reactor for practising the method, which reactor comprises an outer gastight shell 14 with associated inlet and outlet devices for reactants and products, as well as a lining 16, 18 arranged on the inside of the shell 14 and having one or more layers of ceramic barriers.

In order to prevent that the salt melt penetrates through the ceramic lining 16, 18 and reaches the expansion room 20, harming the reactor wall 14, the innermost ceramic barrier 16 of the reactor is, according to the invention, formed essentially from binary and ternary compounds of aluminium oxide ($Al_2O_3$) and at least one of alkali metal oxides ($Me_2^{(I)}O$) and alkaline earth metal oxides ($Me^{(II)}O$).

In a preferred embodiment of the invention at least the inner ceramic barrier 16 contains a mixture of 50-99 mol % $Na_2Al_2O_4$, preferably 55-90 mol % $Na_2Al_2O_4$, 5-35 mol % $MgAl_2O_4$ and 5-10 mol % $Na_2O.MgO.5Al_2O_3$.

Suitably the material contains about 10-20 mol % phases other than $Na_2O.Al_2O_3$, which means that an adequate thermal chock resistance can be achieved. By the content of 5-10 mol % $Na_2O.MgO.5Al_2O_3$ the material is given a buffering capacity as either $MgAl_2O_4$ or $Na_2Al_2O_4$ can be formed depending on the chemical composition of the salt melt.

It is usual to add about 1-3% fine grain $CaCO_3$ (usually lime sludge) to the thick waste liquor/black liquor, in order for the subsequently formed green liquor to be easier to filter/clarify. Hence it is advantageous for the lining material to be adapted to the composition of the salt melt formed in the reactor, which in this case will contain the cations $Na^+$ and $Ca^{2+}$. It is hence advantageous in this case for the lining material also to contain the phase $2Na_2O.3CaO.5Al_2O_3$ that can be at equilibrium with the salt melt as well as with the phase of $Na_2O.Al_2O_3$.

In another preferred embodiment of the invention at least the inner ceramic barrier 16 contains at least 60% $Me_2Al_2O_4$, where Me represents a mixture of Na and K.

In yet another embodiment of the invention preferably 5-20% of the $Al_2O_3$ component in the ceramic barrier 16, 18 is exchanged for the isostructurally similar component $Cr_2O_3$.

According to one embodiment the ceramic barrier 16, 18 is divided in two ceramic barriers consisting of an inner ceramic barrier 16 intended to be in direct contact with the salt melt and consisting of compounds of aluminium oxide ($Al_2O_3$) and at least one of alkali metal oxides ($Me_2^{(I)}O$) and alkaline earth metal oxides ($Me^{(II)}O$), and an outer ceramic barrier 18 consisting of a material having a lower thermal conductivity than the inner layer and being designed such that any melt that by capillary forces or hydrostatic forces strives to penetrate cavities in the form of joints, cracks or porosities in said ceramic barrier layers (16, 18), solidifies to form solid salts at a location within said one or more ceramic barrier layers (16, 18).

It is an advantage if the ceramic barrier 16, 18 is divided in two ceramic barriers consisting of an inner ceramic barrier 16 and an outer ceramic barrier 18, and when applying the lining to the reactor it is suitable between these two barriers to apply a thin layer of a combustible material that after combustion leaves an expansion room between the barriers 16, 18.

It is suggested in prior art that the temperature profile should be controlled such that it is made sure that condensation or transition into the solid phase of alkaline compounds that penetrate into the ceramic lining always takes place inside the lining, preferably inside an outer layer, the base layer, of the lining, irrespective of the condition of the inner layer, the wear layer, that delimits the reaction chamber. It has however been proven at least as important to choose a lining material that does not dangerously expand, thereby quickly consuming the expansion room required for the lining when in contact with the salt melt for a long time.

A plurality of in the main high melting ceramic phases, primarily oxide-containing phases based on the elements Al, Cr, Ca, Mg, Si, and Zr, such as $\alpha\text{-}Al_2O_3$, $Cr_2O_3$, $3Al_2O_3 \cdot 2SiO_2$, $Na_2O \cdot 11Al_2O_3$, $Na_2O \cdot 7Al_2O_3$, MgO, $MgO \cdot Al_2O_3$, CaO and $ZrO_2$, have proven to be relatively stable or inactive in relation to the corrosive salt melt formed in connection with the gasification of black liquor. Also mixtures of two or more such ceramic phases containing $\alpha\text{-}Al_2O_3$, $Na_2O \cdot 11Al_2O_3$, $Na_2O \cdot 7Al_2O_3$, $Na_2O \cdot MgO \cdot 5Al_2O$, $MgAl_2O_4$ and MgO have been tested previously. A mixture has also been tested consisting of $\alpha\text{-}Al_2O_3$ and several different types of so called β-alumina phases in which a part of the $Na^+$-ions in the β-alumina structure has been replaced by $Li^+$, $K^+$, $Mg^{2+}$ and $Ca^{2+}$. β-alumina means $NaAl_{11}O_{17}$ instead of pure aluminium oxide. A prerequisite for a good function as a chemical as well as a thermal barrier is however that the ceramic phases have not been exposed for a long time to a temperature above about 1100° C. in the presence of the salt melt.

The chemical reactions between the ceramic lining and the melt can in principal be divided in three different categories whereof the first two categories cause the ceramic lining dangerously to expand out towards the reactor wall and also cause bursting off of material from the inside of the lining. The third category of chemical reactions will primarily cause a rapid loss of material by certain phases from the inside of the ceramic lining being dissolved in the melt. At the same time as this loss of material, certain other chemical reactions can also take place in the surface layer which moreover can result in the expansion, cracking and falling off of the ceramic lining.

The first mentioned main type of harmful reactions is that alkali in the gas phase, primarily $Na(g)$ and $NaOH(g)$ but also $K(g)$ and $KOH(g)$, penetrates into and reacts with the ceramic lining. The second main type of harmful reactions is that the salt melt penetrates by capillary forces into cracks, joints and pores in order there to react with the ceramic lining. Samples taken from cut out ceramic blocks clearly show that melt cast or sintered ceramic materials contain a large amount of small and large cracks as well as pores from the manufacturing. The ratio between the measured bulk density and the calculated crystallographic density of the phases in such ceramics also shows that in most ceramic kiln materials there is a significant porosity.

These two mentioned reaction categories can be described by a number of simple reaction formulas between alkali components in the gas phase, see formulas (1a, 3a), or alkali in the salt melt, see formulas (1b, 3b, 4c, 4d) and the different phases of the ceramic lining, where the newly formed solid alkaline phases contribute to a significant increase in volume of the total amount of solid materials in the system.

$$2Na(g)+H_2O(g)+11Al_2O_3(s) \leftrightarrow Na_2O \cdot 11Al_2O_3(s)+H_2(g) \tag{1a}$$

$$Na_2CO_3(l)+11Al_2O_3(s) \leftrightarrow Na_2O \cdot 11Al_2O_3(s)+CO_2(g) \tag{1b}$$

$$2Na(g)+H_2O(g)+7Al_2O_3(s) \leftrightarrow Na_2O \cdot 7Al_2O_3(s)+H_2(g) \tag{2a}$$

$$Na_2CO_3(l)+7Al_2O_3(s) \leftrightarrow Na_2O \cdot 7Al_2O_3(s)+CO_2(g) \tag{2b}$$

$$2K(g)+H_2O(g)+11Al_2O_3(s) \leftrightarrow K_2O \cdot 11Al_2O_3(s)+H_2(g) \tag{3a}$$

$$K_2CO_3(l)+11Al_2O_3(s) \leftrightarrow K_2O \cdot 11Al_2O_3(s)+CO_2(g) \tag{3b}$$

$$2Na(g)+H_2O(g)+Al_2O_3(s) \leftrightarrow 2NaAlO_2(s)+CO_2(g) \tag{4a}$$

$$Na_2CO_3(l)+Al_2O_3(s) \leftrightarrow 2NaAlO_2(s)+CO_2(g) \tag{4b}$$

$$Na_2S(l)+H_2O(g)+Al_2O_3(s) \leftrightarrow 2NaAlO_2(s)+H_2S(g) \tag{4c}$$

$$2NaOH(l)+Al_2O_3(s) \leftrightarrow 2NaAlO_2(s)+H_2O(g) \tag{4d}$$

$$2NaOH(g)+Al_2O_3(s) \leftrightarrow 2NaAlO_2(s)+H_2O(g) \tag{4e}$$

Analyses made of aluminium oxide based materials in the reactor unambiguously show that during operation considerable amounts of $NaAlO_2$ as well as other types of β-alumina phases have been formed in the ceramic lining.

Corresponding formulas for reactions between the melt and the two most common alumina phases will be similar. See formulas (5a-7a).

$$10Na_2CO_3(l)+Na_2O \cdot 11Al_2O_3(s) \leftrightarrow 22NaAlO_2(s)+10CO_2(g) \tag{5a}$$

$$5Na_2CO_3(l)+Na_2O \cdot 7Al_2O_3(s) \leftrightarrow 10NaAlO_2(s)+5CO_2(g) \tag{6a}$$

$$4Na_2CO_3(l)+7Na_2O \cdot 11Al_2O_3(s) \leftrightarrow 11Na_2O \cdot 7Al_2O_3(s)+4CO_2(g) \tag{7a}$$

As an example illustrating the undesired large increase in volume, the increase in volume of the solid phases in the system can be calculated to 72.5 cm³ based on the difference between the molar volume of the solid product and the solid reactant for reaction (1a) when 1 mol $Na(g)$ from the gas phase or when 1 mol $Na_2CO_3(l)$ from the melt (1b) reacts with the lining. These two reactions will accordingly give an increase in volume of 26% of the solid phases in the ceramic.

Such a chemically conditioned increase in volume of 26% for the ceramic can suitably be compared with the thermal increase in volume of only about 2.5% of the total volume of the ceramic when the ceramic is heated from 20° C. to 1000° C. Due to this very large chemically conditioned increase in volume, large inner stresses can be built up very fast in the lining during operation, even when just a small fraction of the solid phases in the lining has reacted with the alkali in the gas phase or in the salt melt and has formed other ceramic phases having a larger volume.

Note that when a gas containing sodium or a soda melt penetrates into cracks in a ceramic material, it will generate a very large burst force as it reacts to form solid sodium-containing ceramic phases. This depends on that when the new ceramic phases are formed, in or close to the cracks, they will locally take up a much larger volume than the solid volume that at the same time is consumed in the crack area in connection with the reaction. The newly formed phases in the surface layer and inside the cracks will cause a progressive bursting of the original ceramics at the same time as a larger reaction surface is formed, but also a considerable increase of the total volume of solid ceramic phases in the lining. In this context it should be mentioned that ceramic materials are very brittle and that they have very low tensile and flexural strengths and also easily crack, but that they have a very high compressive strength, which means that a ceramic lining easily can transfer very high compressive loads to the reactor vessel.

Since the ceramic lining is expected to have a life span of at least one year or even longer, it can well be assumed that it is not the in and out transport of gases and melt into/out from the lining that controls the velocity of the reactions (1a-7a) but that the velocity of the reactions is controlled by how fast the different ceramic phases of the lining react with the local salt melt and the gas that in an early stage has penetrated into cracks and pores in the lining.

Some experiments performed with penetrating and strongly coloured aqueous solutions unambiguously show that wetting liquids quickly will penetrate into open pores or into cracks in a melt cast ceramic material. In the same way a carbonate-containing salt melt with good wetting ability on oxide ceramics, a high surface tension and also a low viscosity, can easily penetrate small as well as large cracks in oxide ceramics. Examinations of very large ceramic blocks clearly show that deep inner cracks have been penetrated by the salt melt even if only a part of the outer surfaces of the block have been in direct contact with the salt melt.

The solid alkali-containing reaction products, that of course form fastest in the hottest part of the lining, i.e. on the inner surface of the ceramic lining or close to the inner surface, will normally have a higher thermal expansion coefficient than the original alkaline free lining material. Accordingly, $NaAlO_2$ has a thermal expansion coefficient of $14 \cdot 10^{-16}$ $K^{-1}$ while β-alumina, $Na_2O.11Al_2O_3$ and $Na_2O.7Al_2O_3$, has a thermal expansion coefficient of $7.5 \cdot 10^{-6}$ $K^{-1}$ and α-$Al_2O_3$ has a thermal expansion coefficient of $8.3 \cdot 10^{-6}$ $K^{-1}$. At shutdown and cooling off of the reactor, the formed reaction layer that is rich in $NaAlO_2$ will thermally shrink somewhat more than the original material behind it. Hence, the reaction layer will crack up to form a pattern similar to a chess board when the reactor cools off. Moreover, the ceramic lining will crack tangentially with the formed reaction layer at the locations where the formed chemical and thermomechanical stresses are the largest. Hence, cracked parts of the ceramic lining will easily come loose from the inside of the lining during cooling but also during following heating to normal operating temperature, which causes thermal movements in the lining. Repeated thermal cycling of the ceramic lining can cause a considerable loss of loose reacted material.

The newly formed radial and tangential cracks in the lining will also facilitate transport of additional melt and gas into the materials, which accelerates the continuous and chemically conditioned increase in volume from the surface and between the newly formed cracks. These phenomena result in that considerable amounts of material are continuously split off and lost, at the same time as the lining continues to expand out towards the reactor wall.

Investigations showed that after 7 months of operation in a commercial gasification plant with a conventional aluminium oxide based ceramic lining, a 5-10 mm thick and pink reaction layer had formed in the entire ceramic lining exposed to the salt melt. Moreover, an extensive chess board pattern of cracks had formed in the inner surface of the ceramic lining. The formed reaction layer also had a clear tendency for chipping as well as buckling from the rear part of the relatively unaffected ceramics. Fragments and slices of the formed layer were easy to break loose with a knife from the ceramic surface. The formed pink reaction layer obviously occupied a somewhat larger volume than the lining behind it. Powder x-ray analysis of the formed layer showed that large amounts of $NaAlO_2$ as well as various phases of β-alumina had formed in the reaction layer at the same time as the amount of α-$Al_2O_3$ had decreased.

On a small part of the lining, about 1 $m^2$, the formed reaction layer was 10-30 mm thick at the same time as a significant amount, about 20-30 mm, of the surface layer had fallen off. It appeared that the surface layer had strongly sintered since the remaining ceramic surface has rounded edges and shapes. This strong local reaction can be explained by the oil burner for auxiliary heating of the reactor at times having overheated this part of the ceramic surface and that large oil drops probably had been subjected to pyrolysis directly on the hot surface, after which the formed coke had burned on the surface to cause a strong local overheating on the same. A high temperature results in a fast chemical reaction between the salt melt, the ceramic surface and carbon, which may result in considerable damages on the lining according to reactions (8a) and (9a) below.

$$Na_2CO_3(l) + Al_2O_3(s) + C(s) \leftrightarrow 2NaAlO_2(s) + 2CO(g) \quad (8a)$$

$$2NaOH(l) + Al_2O_3(s) + C(s) \leftrightarrow 2NaAlO_2(s) + CO(g) + H_2(g) \quad (9a)$$

From the investigation it is clear that a lining based on aluminium oxide in contact with a salt melt at a temperature of about 1100° C. in a reducing atmosphere is not thermodynamically stable but instead forms solid $NaAlO_2$. The investigation also shows that the velocity of the reaction between the melt and the solid phases is low at the same time as the solubility of the formed $NaAlO_2$ in the soda melt must be very small. Otherwise, a thick reaction layer containing $NaAlO_2$ could not still exist on the inside of the lining where large amounts of soda melt are continuously generated and flow past the formed reaction layer. Alternatively, the dissolution velocity for $NaAlO_2$ formed in the melt must be very low compared to the formation velocity for $NaAlO_2$, even if the solubility of $NaAlO_2$ in the melt could be allowed to be relatively large in such a case, but this interpretation of the behaviour is considered less plausible. Furthermore, the formed layer of $NaAlO_2$ seems to provide a certain protection against a salt melt attack on the underlying phases with high reactivity.

Examinations of several core samples as well as ground samples from the lining material used for 7 months show, besides formation of a 5-10 mm thick reaction layer in the surface facing the salt melt, that salt melt penetrating into the cracks in the ceramics has reacted with the adjoining solid phases in the cracks, there to form a pink reaction zone that contains $NaAlO_2$ and that has a width of 2-5 mm and a propagation of the cracks that in some cases has gone straight through a 190 mm thick block of melt cast ceramics. Measurements of the available expansion room between the reactor wall and the ceramic lining show that after 7 months of operation the lining has expanded outwards and that about ¾ of the total available expansion room against the wall of the pressure vessel was used. Continued expansion of the lining in operation may in a few months lead to very high mechanical stresses on the reactor vessel, unless the expansion ceases. When the entire expansion room has been used, the entire lining must therefore be torn out from the reactor vessel and be replaced by a new lining.

According to a preferred embodiment it is thus suitable for the main compounds of the lining material to cause a volume expansion of the lining of not more than 10%, preferably not more than 7% and even more preferred 5% at reaction with the formed salt melt.

At high temperatures and a high $Na_2O$ activity $MgO.Al_2O_3$ (spinel) will react with $Na_2O.Al_2O$ (sodium aluminate) according to the formula:

$$Na_2O.Al_2O + 4[MgO.Al_2O_3] \leftrightarrow 3MgO + Na_2O.MgO.5Al_2O_3$$

Hence, it is advantageous for the ceramic barrier to consist of a mixture of 80-95 mol % of the phases $Na_2O.Al_2O$ and $MgO.Al_2O_3$ and a mixture of 5-20 mol-% of the phases MgO and $Na_2O.MgO.5Al_2O_3$.

The fact that the phase of pure MgO.Al$_2$O$_3$ (spinel) is so resistant against the salt melt depends primarily on that it is protected by a dense reaction layer that is formed in contact with the melt and that consists of the phases Na$_2$O.Al$_2$O and MgO that apparently can be in equilibrium with the salt melt. Also note that the stated reaction can take place without any appreciable change in volume, which means that a relatively dense reaction layer is formed on its own on a lining rich in MgO.Al$_2$O$_3$ (spinel), without the tendency for a fast splitting off of the formed reaction layer.

If the ceramic barrier contains CaO.Al$_2$O$_3$ and Na$_2$O.Al$_2$O$_3$ a reaction takes place whereby the ternary phase 2Na$_2$O.3CaO.5Al$_2$O$_3$ is formed according to the formula:

$$2[Na_2O.Al_2O_3] + 3[CaO.Al_2O_3] \leftrightarrow 2Na_2O.3CaO.5Al_2O_3$$

Hence it is advantageous for the ceramic barrier to consist of a mixture of 55-90 mol % Na$_2$O.Al$_2$O, 5-15 mol % CaO.Al$_2$O$_3$ and 5-10 mol % MgO, initially after manufacturing. Note that the two reactions mentioned above will take place without any appreciable change in volume of the solid phases formed, while an admixture of reactive phases constitutes a production advantage in production/sintering of a ceramic barrier since the sintering takes place faster or at a lower temperature. The process is called reaction sintering.

The third category of reactions that are harmful to the stability of the lining are reactions that cause an ongoing dissolution in the salt melt of one or more of the solid phases included in the ceramic surface, which means that material is continuously lost from the exposed surface to the salt melt, in the form of dissolved ions. Furthermore, a secondary effect of a selective dissolution of binder phases in the ceramics can be that other relatively corrosion resistant solid phases quickly will lose foothold in the ceramic surface and be transported away in the form of large or small particles in the salt melt passing by, see reaction formula (10a) below.

$$2Na_2CO_3(l) + SiO_2(s) + Al_2O_3(s) \leftrightarrow [SiO_4^{4-} + 4Na^+]$$
(free ions dissolved in the melt)+Al$_2$O$_3$(s)(solid particles lost to the melt)+CO$_2$(g)  (10a)

New alkaline phases can also be formed in or just below the reaction surface where they locally will take up a considerably larger solid volume than the base layer. Hence, the newly formed solid phases may cause an ongoing cracking of the original lining, resulting in a larger reacting surface facing the melt, see reaction formula (11a) below.

$$2Na_2CO_3(l) + 2SiO_2(s) + Al_2O_3(s) \leftrightarrow Na_2Al_2Si_2O_9(s) + CO_2(g) \quad (11a)$$

Acidic binder phases in the lining, such as phases of SiO$_2$, phases having a low melt temperature or gas phases, are sensitive to this type of damage mechanism when they are in prolonged contact with a flowing alkaline salt melt. Materials with open porosity or a lot of cracks are particularly sensitive to such damages since the attacks then can take place simultaneously on a large exposed surface. For these reasons many silicate based ceramic materials are unsuited for this application at temperatures above the eutectic melt temperature of the salt melt, which is at about 750° C.

As can be expected, melt cast ceramics contain large crystals from the solidification of the melt, as well as a very large amount of micro and macro cracks that are formed during the cooling off in connection with the production, but also some large pores caused by entrapped gas pockets. Some foreign phases in the material, related to impurities, will also be strongly concentrated to the grain boundaries when the main phase solidifies to form a course crystalline ceramic blocks. Small amounts of certain impurity phases having low own corrosion resistance may hence have a large negative affect on the general stability of the material, if they primarily concentrate to the grain boundaries and form reactive attack sites in the material. In the same way, other small additives concentrated in the grain boundaries and having good stability against corrosion in the melt, may positively affect the general stability of the materials.

Thick lining materials that are to withstand repeated temperature changes that are completely normal to the gasification process, when the reactor is heated up and cools off, must however necessarily contain a large amount of micro cracks or pores in order not to immediately crack/burst into a plurality of small pieces from the large inner thermal stresses that always arise in connection with temperature changes in large and densely sintered ceramic blocks.

In order to improve a ceramic lining's thermal stability against thermal shocks, there should be a certain admixture of one or more additional phases in the ceramic lining, provided that these phases also are compatible with the main system and that they are resistant to the soda melt. When a sintered multi-phase ceramic material cools off, there is a strong formation of micro cracks in the ceramics, primarily due to differences in the thermal expansion of the phases. The micro cracks strongly improve the thermal shock resistance of the material and also increase the fracture toughness of the material. Alkaline earth metal oxide additives, primarily MgO, CaO and SrO, are suitable in the production of aluminium oxide based ceramics, since such oxides together with Na$_2$O and Al$_2$O$_3$ can form several high melting and stable binary and ternary phases, which phases prevent the salt melt from penetrating through the ceramic lining reaching the expansion room and damaging the reactor wall.

The conclusion, based on scanning electron microscope analyses, chemical analyses, powder x-ray analyses, thermodynamic analyses, corrosion tests of the behaviour of aluminium oxide based ceramics in sodium-containing salt melts, is accordingly that ceramic linings based on NaAlO$_2$, in accordance with the present invention, are functional in a gasifying reactor for black liquor. Important reasons are that the NaAlO$_2$ phase has a high melt temperature of about 1650° C., that it is very difficult to dissolve in the soda melt at a normal reactor temperature or about 750-1150° C., that it is thermodynamically stable in the salt melt as opposed to most existing aluminium oxide based lining materials that react slowly with the salt melt with a considerable resulting increase in volume which will physically harm the ceramic lining and which can also cause very high mechanical loads on the reactor vessel unless there is an adequately large expansion room available between the ceramic lining and the reactor wall.

Production of a Lining Material

When for example a NaAlO$_2$ based lining is produced, NaAlO$_2$ can be produced from gibbsite (Al(OH)$_3$), bauxite AlO(OH), or fine grained α-Al$_2$O$_3$ or a mixture of these, by a sintering reaction with molten Na$_2$CO$_3$ at a temperature of 1200-1400° C., suitably about 1350° C., see the formula below.

$$Na_2CO_3(l) + 2Al(OH)_3(s) \rightarrow 2NaAlO_2(s) + CO_2(g) + 3H_2O(g)$$

Possibly, additional milling can be required for a partly reacted mixture, followed by a new sintering at a higher temperature, in order to achieve a good chemical transformation and a homogeneous NaAlO$_2$ phase with a suitably large crystal size and good powder pressing properties after milling. The produced NaAlO$_2$ can suitably be dry crushed to form a fine grain powder by aid of grinding bodies of α-$Al_2O_3$. The abrasion of α-$Al_2O_3$ from the grinding bodies can be compensated by a small surplus of $Na_2CO_3$ in the initial composition in connection with the powder synthesis or an extra additive in connection with the final sintering of $NaAlO_2$ based bricks. $NaAlO_2$ powder that has been milled free can than be conventionally formed into formed bodies, by powder pressing, cold isostatic pressing or slip casting in an absorbing forming cavity. It must be pointed out that fine grain $NaAlO_2$ hydrolyses relatively fast in water but also slowly in moist air, which means that water or water-containing milling media or forming additives cannot be used.

The formed bodies are sintered at a temperature of about 1500° C., to a relative density of about 80-90%. The vapour pressure of $Na_2O(g)$ and $Na(g)$ at the sintering temperature for $NaAlO_2$ is probably high enough for the sintering to take place in a reasonably closed kiln system in order for β-alumina phases not to be formed on the surface of the sintered body due to evaporation of $Na_2O$ and Na from free surfaces. Optionally, the formed bodies should be protected in connection with the sintering by being covered with a coarse grain powder of melt cast β-alumina and $NaAlO_2$ in order to decrease the loss of sodium from the surface.

According to a preferred embodiment of the invention, the $Na_2Al_2O_4$ component of the ceramic barrier 16 has therefore been manufactured by allowing $Al(OH)_3$, AlO(OH) or fine grain α-$Al_2O_3$, or a mixture of these, to react with molten $Na_2CO_3$ by a sintering reaction at a temperature of 1200-1400° C., suitably about 1350° C. After cooling off, the reacted mixture has been dry crushed to form a free flowing fine grain powder together with other ceramic powder phases such as $MgAl_2O_4$, in a grinder having grinding bodies of $Al_2O_3$, and the powder mixture has then been filled into a forming cavity and been pressed at a high pressure to form preformed bodies that are then finally sintered in a closed kiln room at a high temperature to give a density that will yield a desired residual porosity of 10-25% in the sintered ceramics. It should be understood that the invention is not limited to the use of mills in order to achieve a free flowing fine grain powder, but that any apparatus can be used that achieves the function of finely distributing and mixing the mixture according to the principles of the invention.

The invention claimed is:

1. A method for arranging a ceramic barrier in a gasifying reactor, which reactor is arranged to convert high energy organic waste of black liquor type with a large amount of organic or inorganic alkali metal compounds, by high temperature oxidation with air or oxygen, whereby the organic waste is converted to a hot reducing gas containing a considerable amount of water vapor and the inorganic compounds form an alkali-containing salt melt at a temperature of 750-1150° C., and which reactor is arranged to comprise an outer shell with associated inlet and outlet devices for reactants and products, the method comprising arranging a ceramic lining comprising one or more ceramic barrier layers on the inner side of the shell, arranging the total thickness and the thermal conductivity of the lining such that an inner surface of the lining facing the reaction chamber gets a high enough temperature for the formed salt melt getting in contact with this surface to have a high enough volume part of melt in order to flow freely on this surface, and the temperature in the rest of the lining, which is positioned closer to the outer shell, being low enough for the formed salt melt, that by capillary forces or hydrostatic forces strives to penetrate cavities in the form of joints, cracks or porosities in said one or more ceramic barrier layers, to solidify to form solid salts at a location within said one or more ceramic barrier layers, and that the temperature of the reactor shell is controlled in order to prevent detrimental over-temperatures on the reactor shell, the ceramic lining having an innermost ceramic barrier constructed to be in direct contact with the salt melt and an outer ceramic barrier constructed to allow the salt melt to solidify within the outer ceramic barrier, wherein the innermost ceramic barrier of the reactor comprising a lining material that consists essentially of compounds of aluminium oxide ($Al_2O_3$) and at least one of alkali metal oxides ($Me_2(^I)O$) and alkaline earth metal oxides ($Me(^{II})O$), forming compounds of the type $Me_2(^I)OAl_2O_3$ and $Me(^{II})OAl_2O_3$, and the outer ceramic barrier having a lower thermal conductivity than the inner ceramic barrier layer.

2. A method according to claim 1, wherein said compounds cause a volume expansion of the lining of not more than 10% during reaction of the formed salt melt.

3. A method according to claim 1, wherein said compounds cause a volume expansion of the lining of not more than 7% during reaction of the formed salt melt.

4. A method according to claim 1, wherein said compounds cause a volume expansion of the lining of not more than 5% during reaction of the formed salt melt.

5. A method according to claim 1, wherein the energy rich organic waste is combusted with air or oxygen-enriched air at an enhanced reactor pressure.

6. A method according to claim 1, wherein the energy rich organic waste is combusted with air or oxygen-enriched air at a pressure of 0.2-5 MPa.

7. A method according to claim 1, wherein the energy rich organic waste consists essentially of thick waste liquor/black liquor from a pulp mill.

8. A chemical reactor for the conversion of high energy organic waste of black liquor type with a large amount of organic or inorganic alkali metal compounds, by partial high temperature oxidation with air or oxygen, whereby the organic waste is converted to a hot reducing gas containing a considerable amount of water vapor, hydrogen gas and carbon monoxide and the inorganic compounds form an alkali-containing salt melt at a temperature of about 750-1150° C., which reactor comprises:

an outer shell having associated inlet and outlet devices for reactants and products as well as a ceramic lining arranged on the inner side of the shell and comprising one or more ceramic barrier layers, the total thickness and the thermal conductivity of the lining being chosen such that an inner surface of the lining facing the reaction chamber achieves a high enough temperature for the formed salt melt in contact with this surface during operation to have a high enough volume part of melt in order to flow freely on this surface, and the temperature in the rest of the lining, which is positioned closer to the outer shell, remaining low enough for the formed salt melt, that by capillary forces or hydrostatic forces strives to penetrate cavities in the form of joints, cracks or porosities in said one or more ceramic barrier layers, solidifies to form solid salts at a location within said one or more ceramic barrier layers during operation; and a controller for controlling the temperature of the reactor shell to prevent detrimental over-temperatures on the reactor shell, wherein the ceramic lining is thermodynamically stable in the salt melt, the ceramic lining having an innermost ceramic barrier constructed to be in direct contact with the salt melt and an outer ceramic barrier constructed to allow the salt melt to solidify within the outer ceramic barrier, the innermost ceramic barrier of the reactor consists of compounds of aluminium oxide ($Al_2O_3$) and at least one of alkali metal oxides ($Me_2(^I)O$) and alkaline earth metal oxides (Me ($^{II}$)O), forming compounds of the type Me$_2$($^I$)OAl$_2$O$_3$ and Me($^{II}$)OAl$_2$O$_3$ and the outer ceramic barrier consisting of a material having a lower thermal conductivity than the inner ceramic barrier layer.

9. A chemical reactor according to claim 8, wherein said compounds cause a volume expansion of the lining of not more than 10% during reaction of the formed salt melt.

10. A chemical reactor according to claim 8, wherein said compounds cause a volume expansion of the lining of not more than 7% during reaction of the formed salt melt.

11. A chemical reactor according to claim 8, wherein said compounds cause a volume expansion of the lining of not more than 5% during reaction of the formed salt melt.

12. A chemical reactor according to claim 8, wherein at least the inner ceramic barrier comprises of a blend of 50-90 mol % Na$_2$Al$_2$O$_4$, 5-35 mol % MgAl$_2$O$_4$ and 5-10 mol % Na$_2$O—MgO-5Al$_2$O$_3$.

13. A chemical reactor according to claim 8, wherein at least the inner ceramic barrier comprises at least 60% of Me$_2$Al$_2$O$_4$, in which Me represents a mixture of Na and K.

14. A chemical reactor according to claim 8, wherein 5-20% of the Al$_2$O$_3$ component in the ceramic barrier is exchanged for the isostructurally similar component Cr$_2$O$_3$.

15. A chemical reactor according to claim 8, wherein a compliant barrier of ceramic or metallic materials is arranged between the outer ceramic barrier and the reactor shell, which compliant barrier can be compressed in respect of its thickness by at least 60% at a pressure of not more than 1 MPa and has resilient properties of at least 10% when releasing the pressure to 0.05 MPa.

16. A reactor lining intended to be used in a reactor according to claim 8, wherein the inner ceramic barrier of the lining comprises primarily compounds of aluminium oxide (Al$_2$O$_3$) and at least one of alkali metal oxides (Me$_2$($^I$)O) and alkaline earth metal oxides (Me($^{II}$)O), and of normal impurities from the production.

17. A reactor lining according to claim 16, wherein said compounds cause a volume expansion of the lining of not more than 10% during reaction of the formed salt melt.

18. A reactor lining according to claim 16, wherein said compounds cause a volume expansion of the lining of not more than 7% during reaction of the formed salt melt.

19. A reactor lining according to claim 16, wherein said compounds cause a volume expansion of the lining of not more than 5% during reaction of the formed salt melt.

20. A reactor lining according to claim 16, wherein said inner ceramic barrier comprises 50-99% of Me$_2$($^I$)Al$_2$O$_4$ or Me($^{II}$)Al$_2$O$_4$, Me($^I$) representing Na, or K or a mixture of Na and K, and Me($^{II}$) representing Mg, Ca or Sr or a mixture of them.

21. A reactor lining according to claim 16, wherein said inner ceramic barrier comprises 55-95% of Me$_2$($^I$)Al$_2$O$_4$ or Me($^{II}$)Al$_2$O$_4$, Me($^I$) representing Na, or K or a mixture of Na and K, and Me($^{II}$) representing Mg, Ca or Sr or a mixture of them.

22. A reactor lining according to claim 20, wherein the inner ceramic barrier contains 50-99 mol % Na$_2$Al$_2$O$_4$.

23. A reactor lining according to claim 20, wherein the inner ceramic barrier contains 55-95 mol % Na$_2$Al$_2$O$_4$.

24. A reactor lining according to claim 22, further comprising at least one of 1-35 mol % MgAl$_2$O$_4$ and max 20 mol % Me$_2$O—MgO-5Al$_2$O$_3$.

25. The chemical reactor according to claim 8, further comprising a source of black liquor from a pulp plant in communication with the inlet of the outer shell.

26. The chemical reactor according to claim 8, wherein the innermost ceramic barrier is suitable for containing a conversion of high energy organic waste of black liquor type with a large amount of organic or inorganic alkali metal compounds, by partial high temperature oxidation with air or oxygen, whereby the organic waste is converted to a hot reducing gas containing a considerable amount of water vapor, hydrogen gas and carbon monoxide and the inorganic compounds form an alkali-containing salt melt at a temperature of about 750-1150° C.

27. The chemical reactor according to claim 8, wherein silicate based binder phases are excluded from the innermost ceramic barrier.

28. A method for the manufacturing of a material intended to be used as a building block in a reactor lining intended to be used in a reactor according to claim 24, wherein in the manufacturing of a Na$_2$Al$_2$O$_4$ component of the ceramic barrier by allowing Al(OH)$_3$, AlO(OH) or fine grain α-Al$_2$O$_3$, or a mixture of these, to react with molten Na$_2$CO$_3$ by a sintering reaction at a temperature of 1200-1400° C., dry crushing the reacted mixture, after cooling off, to form a free flowing fine grain powder together with other ceramic powder phases such as MgAl$_2$O$_4$, in a grinder having grinding bodies of Al$_2$O$_3$, and filling the powder mixture into a forming cavity and pressing it at a high pressure to form bodies that are then sintered in a closed kiln room at a high temperature to give a density that will yield a desired residual porosity of 10-25% in the sintered ceramics.

29. Method according to claim 28, wherein the sintering temperature is about 1350° C.

30. A chemical reactor for the conversion of high energy organic waste of black liquor type with a large amount of organic or inorganic alkali metal compounds, by partial high temperature oxidation with air or oxygen, whereby the organic waste is converted to a hot reducing gas containing a considerable amount of water vapor, hydrogen gas and carbon monoxide and the inorganic compounds form an alkali-containing salt melt at a temperature of about 750-1150° C., which reactor comprises:

an outer shell having associated inlet and outlet devices for reactants and products as well as a ceramic lining arranged on the inner side of the shell and comprising one or more ceramic barrier layers, the total thickness and the thermal conductivity of the lining being chosen such that an inner surface of the lining facing the reaction chamber achieves a high enough temperature for the formed salt melt in contact with this surface during operation to have a high enough volume part of melt in order to flow freely on this surface, and the temperature in the rest of the lining, which is positioned closer to the outer shell, remaining low enough for the formed salt melt, that by capillary forces or hydrostatic forces strives to penetrate cavities in the form of joints, cracks or porosities in said one or more ceramic barrier layers, solidifies to form solid salts at a location within said one or more ceramic barrier layers during operation; and a controller for controlling the temperature of the reactor shell to prevent detrimental over-temperatures on the reactor shell, wherein the ceramic lining is thermodynamically stable in the salt melt, the ceramic lining having an innermost ceramic barrier constructed to be in direct contact with the salt melt and an outer ceramic barrier constructed to allow the salt melt to solidify within the outer ceramic barrier, the innermost ceramic barrier of the reactor comprises primarily compounds of aluminium oxide (Al$_2$O$_3$) and at least one of alkali metal oxides (Me$_2$($^I$)O) and alkaline earth metal oxides (Me($^{II}$)O), forming compounds of the type Me$_2$($^I$)OAl$_2$O$_3$ and Me($^{II}$)OAl$_2$O$_3$, wherein the innermost ceramic barrier is free of silica based materials, and the outer ceramic barrier having a lower thermal conductivity than the inner ceramic barrier layer.

* * * * *